United States Patent Office.

LEANDER C. GIFFORD, OF MONTICELLO, ILLINOIS.

Letters Patent No. 114,798, dated May 16, 1871.

IMPROVEMENT IN COMPOUNDS FOR PRESERVING FRUIT-TREES.

The Schedule referred to in these Letters Patent and making part of the same.

*To all whom it may concern:*

Be it known that I, LEANDER C. GIFFORD, of Monticello, in the county of Piatt and State of Illinois, have invented a new and useful Improvement in Compound for Protecting and Restoring Fruit-Trees; and I do hereby declare that the following is a full, clear, and exact description thereof, which will enable others skilled in the art to make and use the same.

This invention relates to a new and useful improvement in a chemical compound, to be introduced into fruit-trees for protecting the same against blight and restoring blighted trees; and It consists in the use of the ingredients hereinafter named in about the proportions specified.

In carrying out my invention I use two parts of calomel (by weight) and one part carbonate soda, mixed together in the dry state.

This compound is introduced into the tree by boring a hole in the body or branch, or in any other manner, so that it will be dissolved by and mingle with sap.

The effect is to purify and give the sap vigor and to prevent blight, and to expel the disease from trees already affected.

I do not confine myself to any particular mode of applying the compound.

Having thus described my invention,

I claim as new and desire to secure by Letters Patent—

The above-described compound, substantially as and for the purposes set forth.

LEANDER C. GIFFORD.

Witnesses:
S. C. LANGDON,
ANDREW M. THORP.